United States Patent [19]

Zhang et al.

[11] Patent Number: 5,112,463

[45] Date of Patent: May 12, 1992

[54] APPARATUS FOR WATER ELECTROLYSIS

[75] Inventors: XueMing Zhang, P.O. Box 314, Beidaihe, Hebei 066100, PRC; Shucheng Zhang, Beidaihe; Shuxia Zhang, Beidaihe; Congshan Liu, Beidaihe; Haibuo Zhang, Beidaihe; Wenrong Li, Beidaihe; Qingyan Ji, Beidaihe; Shufang Zhang, Beidaihe; Shuwei Zhang, Biedaihe, all of China

[73] Assignee: XueMing Zhang, China

[21] Appl. No.: 643,597

[22] Filed: Jan. 18, 1991

[30] Foreign Application Priority Data

Sep. 3, 1990 [CN] China .............................. 90107241.9

[51] Int. Cl.⁵ .................. C25B 1/08; C25B 1/10; C25B 1/12; C25B 9/00
[52] U.S. Cl. .......................... 204/237; 204/256; 204/258; 204/266; 204/283; 204/292; 204/295
[58] Field of Search ............................... 204/252-258, 204/263-266, 237, 282-284, 292, 290 R, 295

[56] References Cited

U.S. PATENT DOCUMENTS

| 2,871,179 | 1/1959 | Zdansky | 204/290 R X |
| 2,881,123 | 4/1959 | Zdansky | 204/256 |
| 4,323,435 | 4/1982 | Carlin | 204/258 X |
| 4,331,523 | 5/1982 | Kawasaki | 204/258 X |
| 4,445,994 | 5/1984 | Divisek et al. | 204/258 |
| 4,746,415 | 5/1988 | Boulton et al. | 204/290 R X |
| 5,013,418 | 5/1991 | Wüllenweber et al. | 204/283 X |

Primary Examiner—Donald R. Valentine
Attorney, Agent, or Firm—Nilsson Robbins Dalgarn Berliner Carson & Hurst

[57] ABSTRACT

Apparatus for efficiently electrolyzing water comprising an electrolysis cell and gas-liquid separating mechanism, wherein the electrolysis cell is composed of a plurality of compartments, each of which has two plate electrodes with a membrane assembly sandwiched therebetween, the plate electrodes and the membrane assembly are spaced by a concavo-convex ion net and a concavo-convex nichel net respectively so that the spacing between the two electrodes is greatly reduced.

6 Claims, 5 Drawing Sheets

APPARATUS FOR WATER ELECTROLYSIS

FIELD OF THE INVENTION

The present invention relates to an apparatus for water electrolysis, particularly to an apparatus for efficiently electrolyzing water at low cost.

BACKGROUND OF THE INVENTION

The efficient and inexpensive production of hydrogen by water electrolysis is a subject attracting worldwide interest. Most exsisting apparatus for water electrolysis are inefficient and expensive. Efforts have been made to raise the efficiency of the water electrolysis so as to produce hydrogen on an industrialscale. For example, U.S. Pat. No. 4,795,537 to Richard R. Timewell discloses an electrical conditioning system for electrodes in an electrolysis cell, in which a pulsating DC voltage is generated and applied to the electrode means to be conditioned in a manner that hydrogen is produced at the cathodic portion of the electrode means and the anodic portion of said electrode means is maintained substantially in a state of passivation. Chinese Patent Application No. 89101949 shows a small sized apparatus for electrolyzing water, which raises the efficiency of water electrolysis by means of a high frequency pulsating DC power source. However, the spacing between the electrodes is relatively large (about 8 mm) and this prevents the efficiency from being further raised.

SUMMARY OF THE INVENTION

The object of the present invention is to provide an inexpensive apparatus for efficiently electrolyzing water.

Another object of the present invention is to provide an electrolysis cell which can be easily manufactured such that the spacing between the plate electrodes is confined to 1-1.5 mm.

The apparatus for water electrolysis according to the present invention comprises an electrolysis cell, a gas-liquid separating mechanism and a power source, wherein said electrolysis cell is composed of a plurality of electrolysis compartments (6) connected with each other in series, each electrolysis compartement has two electrode plates (4) defining an anode and a cathode respectively; a membrane assembly made of an iron sieve (53) (on the cathode side) and a nickel sieve (9) (on the anode side) sandwiched therebetween a thin sheet of asbestos material (10, 11) is disposed between said electrode plates with rion sieve (53) facing the cathode and nickel sieve (9) facing the anode; said cathode and said iron sieve of the membrane assembly are spaced by a concaveconvex iron net (54) connected therebetween, said anode and said nickel sieve (9) are spaced by a concavo-convex nickel net (8) connected therebetween such that said iron sieve (53) and said nickel sieve (9) form a part of the cathode and a part of the anode respectively; said electrode plates and said membrane assemblies have upper opening for gas exhaust and lower openings as liquid inlet near the upper and lower ends and perpendicular to the planes thereof; said plurality of electrolysis compartments are fastened together to form said electrolysis cell.

BRIEF DESCRIPTION OF THE DRAWINGS

In the drawings like numerals represent like elements.

DETAILED DESCRIPTION OF THE PREFERRED EMBODIMENT

Figure 1:
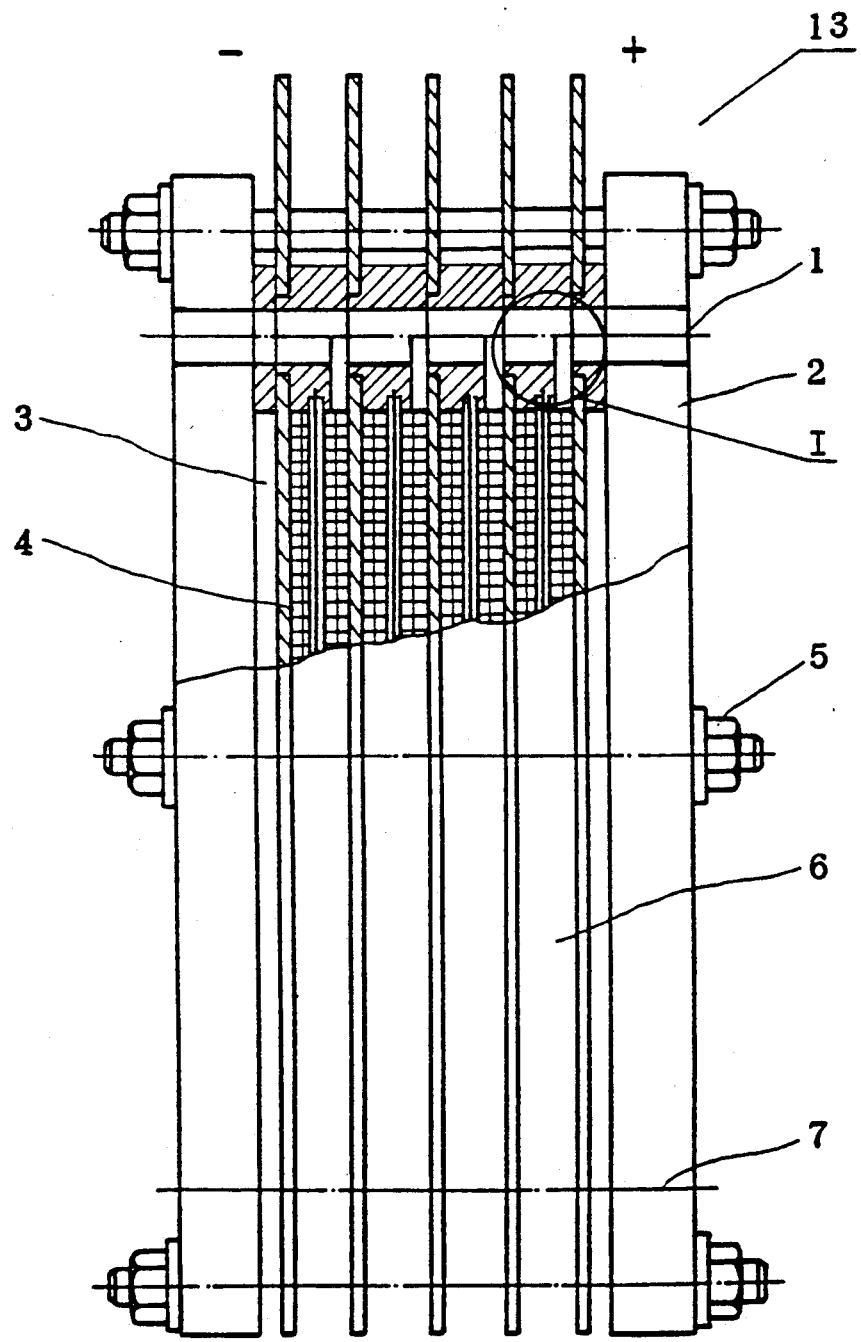
FIG. 1 schematically shows the assembly of the electrolysis cell according to the present invention.

FIG. 1 shows the assembly of the electrolysis compartments of the electrolysis cell according to the present invention. In FIG. 1, 4 electrolysis compartments (not limited to 4) are tightly fixed together by a pair of anticorrosive clamping boards (2) and bolts (5) to constitute an electrolysis cell (13). A number of upper openings (1) are provided near the upper end of the electrolysis compartment and clamping board for gas exhaust and lower openings (7) near the lower end as liquid inlet. (4) indicates the electrode plate.

Figure 2:
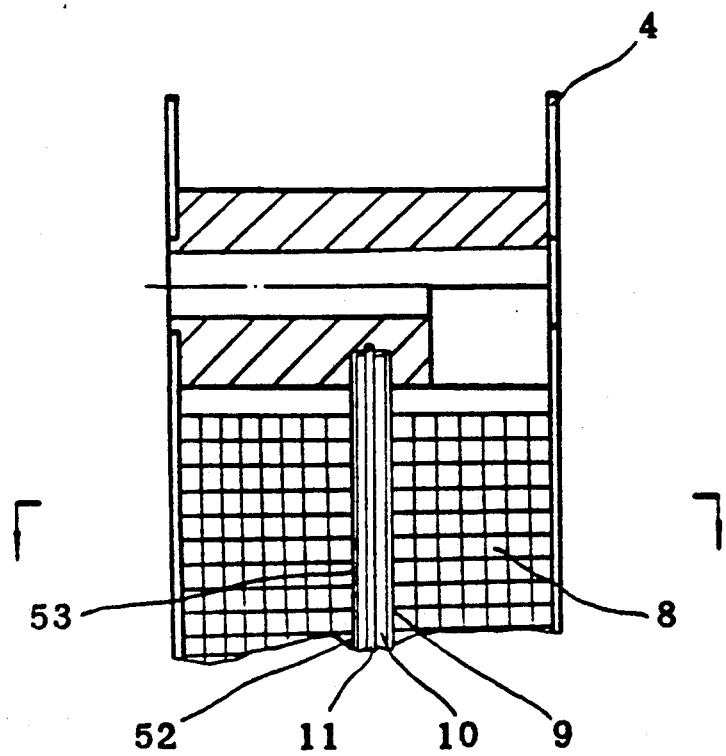
FIG. 2 is an enlarged view of section I of FIG. 1.
Figure 3:
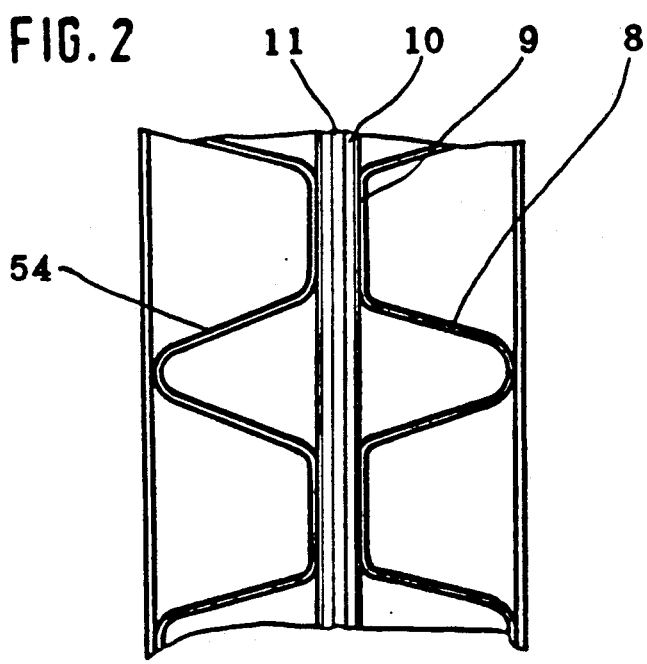
FIG. 3 is the top view of the enlarged section I in FIG. 2.

The construction of the membrane assembly of the electrolysis compartment and the interconnection between the membrane assembly and the electrode plates are shown in FIG. 2 and 3. The membrane assembly is made of an iron sieve (53) and a nickel sieve (9) sandwiched therebetween a thin sheet of asbestos material comprising a piece of osbestos paper (11) and two pieces of cotton cloth or glass fiber cloth (10). Asbestos paper (11) which is made up of purified and bleached asbestos mingled with a little of adhesive through a pressing process is 0.2-0.5 mm thick. The adhesive used is the kind that does not react chemically with alkali. Cotton cloth (10) is laid on each of two surfaces of asbestos paper (11) and then pressed on one side by an iron sieve (53) and on the other side a nickel sieve (9) respectively to form a membrane assembly. Electrode plate (4) is an iron plate having two main surfaces. One surface serves as anode for an electrolysis compartment, the other surface serves as cathode for the adjacent electrolysis compartment. The surface serving as anode is nickel-plated. A concave-covex nickel net (8) is disposed between the anodic surface of the electrode plate (4) and nickel sieve (9) and pressed against them. Similarly, a concave-convex iron net (54) is disposed between the cathodic surface and iron sieve (53) and pressed against them, as shown in FIG. 3. Therefore, nickel sieve (9) and iron sieve (53) form a part of anode and a part of cathode respectively. This significantly narrows the spacing between the anode and cathode to 1-1.5 mm and greatly reduces resistance between the electrodes to the ions, resulting in the reduction of power consumption and the improvement of electrolysis efficiency.

Figure 4:
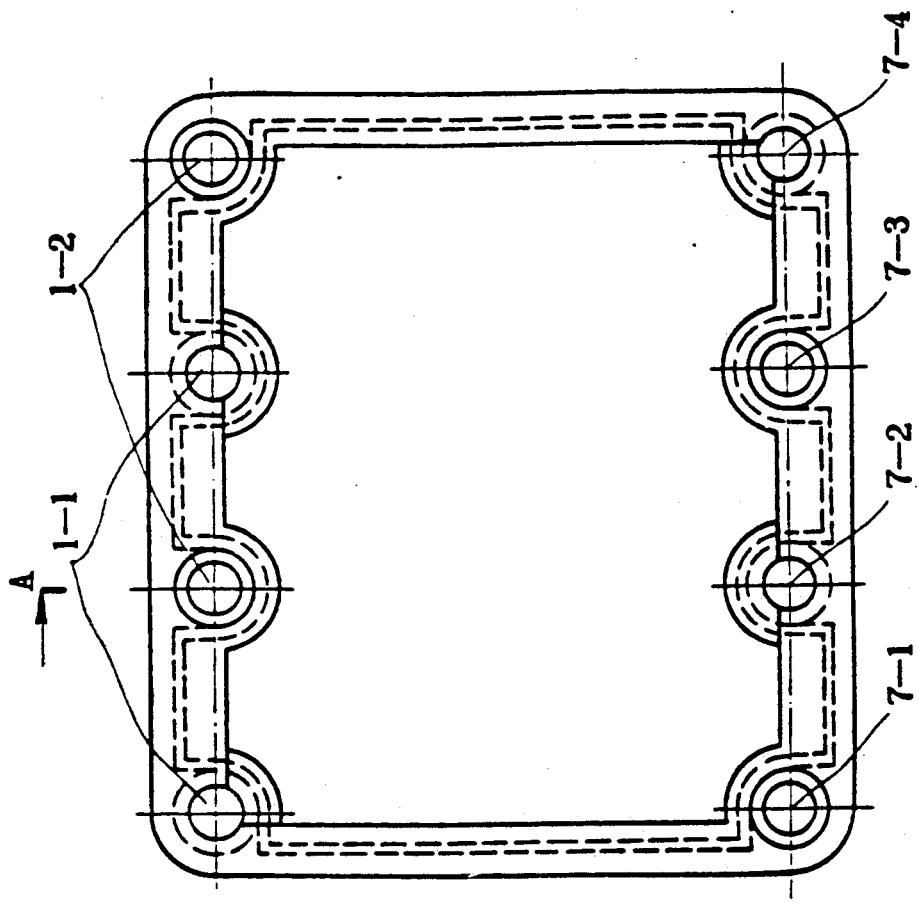
FIG. 4 is the front view of the membrane assembly of the electrolysis compartment in the electrolysis cell according to the present invention.

FIG. 4 is the front view of the membrance assembly In FIG. 4 (1-1) represents hydrogen exhausting openings; (1-2) represents oxygen exhausting openings; (7-1), (7-2) (7-3) and (7-4) represent electrolyte inlets. Among the openings. (1-1) is communicating with (7-2) and (7-4), while (1-2) is communicating with (7-1) and (7-3).

Figure 5:
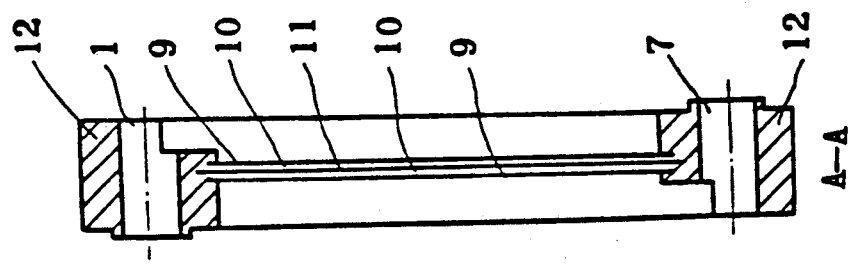
FIG. 5 is a sectional view along line A—A of FIG. 4.

FIG. 5 is a sectional view of the membrane assembly shown in FIG. 4. The shadowed part 12 represents a perduren rim integrally connected with the membrane assembly, on which gas exhausting opening 1 and liquid inlet opening 7 are provided.

Figure 6:
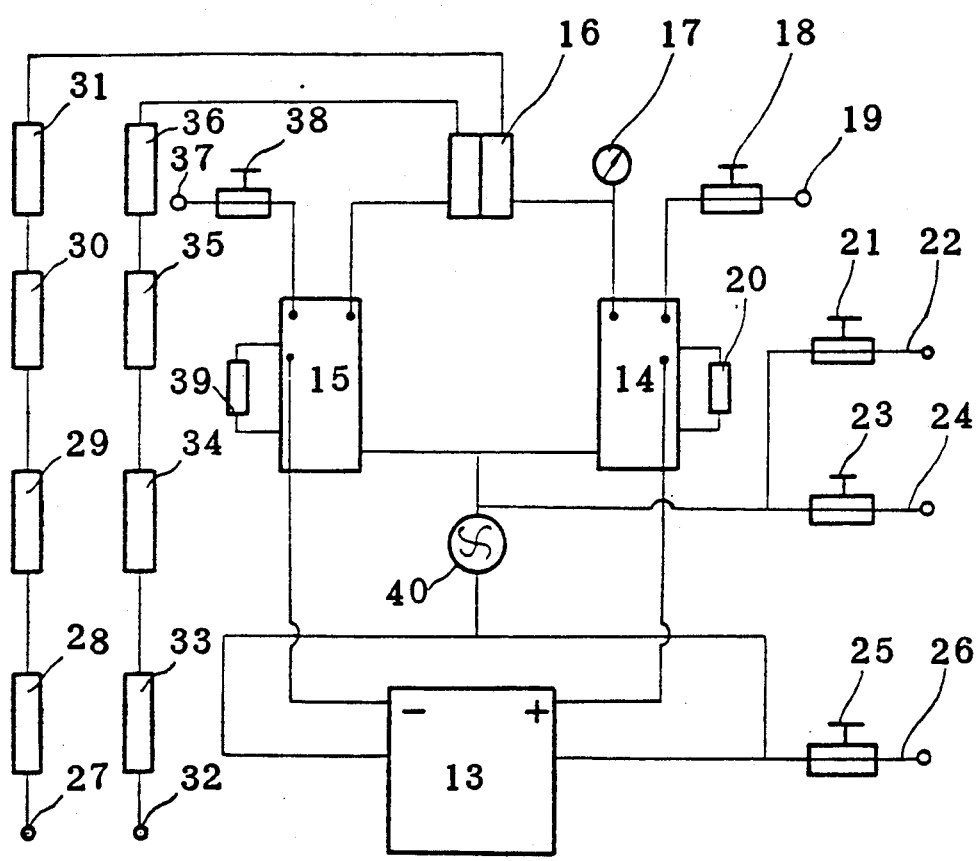
FIG. 6 schematically shows the intercommunication between the electrolysis cell and the gas-liquid separating mechanism according to the present invention.

FIG. 6 shows intercommunication between electrolysis cell 13 and the gas-liquid separating mechanism. A liquid outlet (26) for discharging the electrolyte in electrolysis cell (13) and a valve (25) for controlling outlet (26) are connected with cell (13) via pipes. A gas-liquid separating means (15) for hydrogen and a gas-liquid separating means (14) for oxygen communicate with a circulating pump (40) in a manner at liquid from separating means (14) and separating means (15) is recycled by means of pump (40). A level gauge (20) for monitoring liquid level in means (15) is provided thereon. Another level gauge (39) is provided on means (14). A liquid outlet (24) and a valve (23) for controlling outlet (24) are provided at the common passage from means (14) and means (15) to circulating pump (40). A fresh electrolyte inlet 22 and a valve 21 for controlling inlet 22 are also provided at said passage. A pipe 19 and a valve 18 are connected with separating means (14) to exhaust oxygen. A pipe (37) and a valve (38) are connected with separating means (15) to exhaust hydrogen. Hydnogen and oxygen from means (14) and means (15) whose pressure is monitored by a pressure meter (17) are sent to the users via a gas pressure controlling valve (16), stills (29) and (34) for purification, active charracal absorbers (28) and (33), and then pipes (27) and (32).

Figure 7:
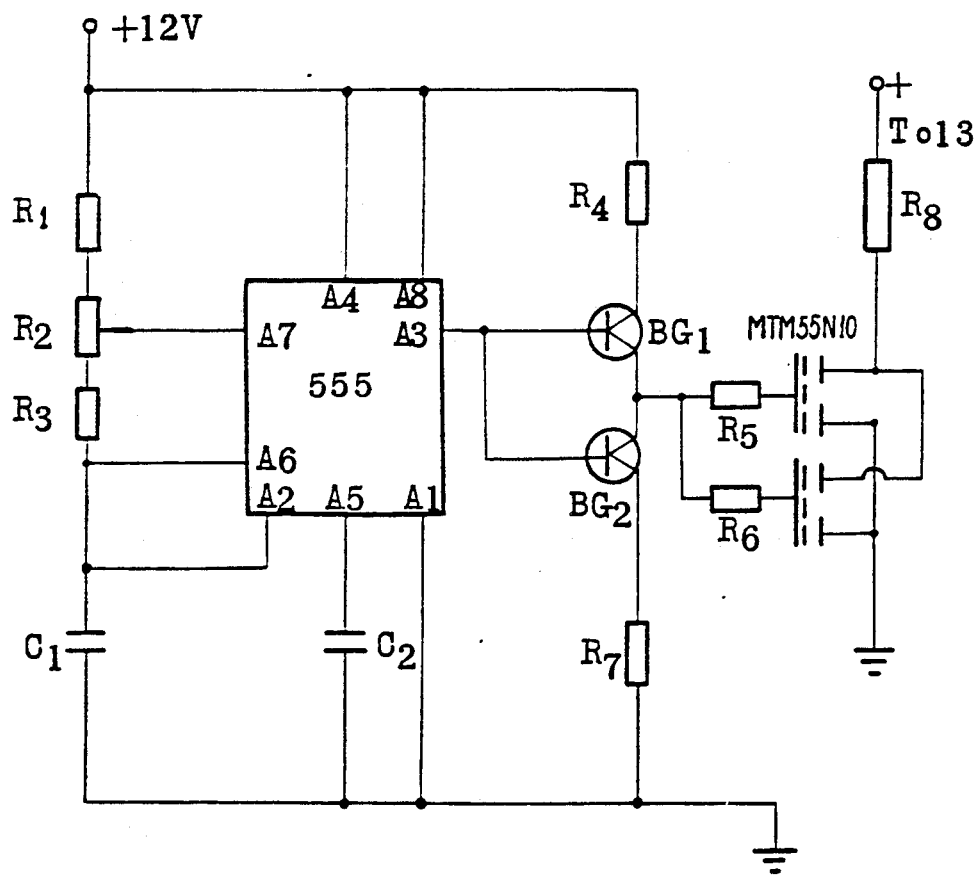
FIG. 7 shows the circuit arrangement of the high frequency pulsating DC power source.

The power source for electrolysis cell (13) is shown in FIG. 7, which is a high frequency pulsating DC supply source. In FIG. 7, an integrated circuit 555, resistors R1, R2, R3 and capacitors C1 and C2 constitute a high frequency pulsating DC supply which controls triodes BG1 and BG2, thereby activates power transistor MTM55N10 to energize electrolyser (13). The power source generates rectangular pulses with a duration ratio of 2/5-4/5 at a frequency over 3000 Hz. The adoption of such a high frequency pulsating DC power source greatly improves power utilization efficiency.

EXAMPLE

In a electrolysis cell formed by 24 electrolysis compartments in 4 parallely connected groups (each group consists of 6 compartments connected in series), an electrolyte compossed of 25-28% (by weight) potassium hydroxide, 20-240PPM (preferably 60-70PPM) additive chloroplatinic acid and 20-240PPM (preferably 60-70PPM) additive cobalt nitrate is adopted. The result is shown in table 1.

variations can be made by those skilled in the art without departing from the spirit of the invention; and all these modifications and variations fall into the scope of the present invention.

We claim:

1. An apparatus for water electrolysis comprises an electrolysis cell, a gas-liquid separating mechanism and a power source, wherein said electrolyser is composed of a plurality of electrolysis compartments connected with each other in series; each electrolysis compartment has two electrode plates defining an anode and a cathode respectively; a membrane assembly made of an iron sieve and a nickel sieve sandwiched therebetween a thin sheet of asbestos material is disposed between said electrode plates with iron sieve facing the cathode and nickel sieve facing the anode; said cathode and said iron sieve of the membrane assembly are spaced by a concavo-convex iron net connected therebetween, said anode and said nickel sieve are spaced by a concavo-convex nickel net connected therebetween such that said iron sieve and said nickel sieve form a part of cathode and a part of anode respectively; said electrode plates and said membrane assemblies have upper opening for gas exhaust and lower openings as liquid inlet near the upper and lower ends and perpendicular to the planes thereof; said plurality of electrolysis compartments are fastered together to form said electrolyser.

2. An apparatus for water electrolysis according to claim 1, wherein a perduren rim is integrally fixed on the edges of said membrane assemblies in which said openings are provided.

3. An apparatus for water electrolysis according to claim 1, wherein a high frequency pulsating DC power source is provided for said electrolysis.

4. An apparatus for water electrolysis according to claim 1, wherein said gas-liquid separating mechanism comprises a gas-liquid separating means for hydrogen and a gas-liquid separating means for oxygen.

5. An apparatus for water electrolysis according to claim 1, wherein said asbestor material sheet is 1-1.5 mm thick.

6. An apparatus for water electrolysis comprises: an electrolyser having at least a hydrogen outlet, a oxygen outlet and a liquid inlet; said hydrogen outlet and said oxygen outlet being connected with a gas-liquid separating means for hydrogen and a gas-liquid separating means for oxygen respectively; a first purifying means connected with a gas outlet of said separting means for hydrogen via a gas pressure controlling valve means; a second purifying means connected with a gas outlet of said separating means for oxygen; said liquid inlet of said electrolysis cell being connected with a liquid outlet of said separating means for hydrogen and a liquid outlet of said separating means for oxygen.

TABLE 1

| Volume of Electrolyte (L) | Voltage (V) | Current (A) | Time (Min) | Hydrogen Produced (mL) | Oxygen Produced (ml) | Power consumption (W) | electrolytic efficiency (%) |
|---|---|---|---|---|---|---|---|
| 12 | 11.4 | 15 | 1 | 668.7 | 394.37 | 171 | 87 |

The present invention is described by way of but not limited to an emobdiment. However, modifications and

* * * * *